United States Patent [19]

Sigourney

[11] Patent Number: 5,251,993
[45] Date of Patent: Oct. 12, 1993

[54] CONNECTING STRUCTURE

[76] Inventor: James W. Sigourney, 101 Loudoun St., SW., Leesburg, Va. 22075

[21] Appl. No.: 934,239

[22] Filed: Aug. 25, 1992

[51] Int. Cl.⁵ ............................................. F16B 5/02
[52] U.S. Cl. ..................................... 403/52; 403/167; 403/4; 411/104; 411/384; 248/298; 405/284; 405/262
[58] Field of Search ............... 403/52, 4, 167, 168, 403/384, 387, 388, 43, 46, 47, 260, 262; 52/645; 405/262, 284, 286; 248/298; 411/104, 383, 384

[56] References Cited

U.S. PATENT DOCUMENTS

| | | | |
|---|---|---|---|
| 1,380,724 | 6/1921 | Lindsay | 403/52 X |
| 4,913,594 | 3/1990 | Sigourney | 405/285 |
| 5,002,436 | 3/1991 | Sigourney | 405/286 X |

FOREIGN PATENT DOCUMENTS 897472 3/1972 Canada.
134436 6/1986 Japan.

Primary Examiner—Randolph A. Reese
Assistant Examiner—George D. Spisich
Attorney, Agent, or Firm—Watson, Cole, Grindle & Watson

[57] ABSTRACT

A structure for connecting a fixed support to a facing panel, in which rotatable L-shaped brackets are mounted on the support and panel and a rod extends between pins mounted in the bracket legs, so that the effective length of the rod may be varied and the brackets rotated to correct for misalignment between the support and the panel.

11 Claims, 2 Drawing Sheets

CONNECTING STRUCTURE

FIELD OF THE INVENTION

The present invention is directed to means for connecting a fixed support, such as that found at the face of an excavation made prior to erection of a structure, with a facing panel that is held in fixed position relative to the face of the excavation to protect, support or mask the excavation face.

BACKGROUND OF THE INVENTION

It has long been known that, when there is an excavation that will be used to support a large structure, it is desirable to cover the excavation face with what is known as a facing panel, often made of concrete or other materials. The facing panel serves both to protect the excavation face and to support the face against accidental discharge of loose dirt, rocks, or other materials from which the soil at the face is composed. Also, fill may be placed between the excavation face and the facing panel so that there will be a smooth and continuous abutment of the facing panel with what might be termed an extended face of the excavation.

In normal practice the facing panels, which can be formed of precast concrete, are formed at or even away from the job site, with the means for connecting them to the facing panel formed as an integral part of their structure. In a somewhat similar manner, connecting means that extends from the excavation face or from a support fixed to that face, also has its connecting means located in fixed position abutting from the excavation face. This is the case when the connecting means that is part of the excavation face is a soldier pile, a soil nail, or such other structure as can be securely fixed to the excavation face.

A problem often arises when it is desired to erect the facing panel with its pre-secured connecting means, to the excavation face, which also has connecting means secured to it. Because the work has been previously performed, it will often be the fact that, because of variations in the excavation face or other abnormalities, the connecting means on the facing panel that serves to hold that panel in position substantially parallel with the excavation face, will not be aligned with the connecting means on the excavation face. Such failure of alignment formerly required removal of at least one of the connecting means and repositioning of it, which was most time-consuming and expensive. Also, since such repositioning was being done in the field, it was found to be difficult to adjust the connecting means to achieve the precise alignment between the fixed support of the excavation and the facing panel.

In order to overcome this misalignment, connecting means were placed under stress to compel their connection, and such stress could ultimately result in material fatigue. As a consequence, the problem has been known that there must be some simple means to adjust misaligned connecting means on a facing panel and the fixed support at an excavation face. In addition, the means must be sturdy and readily adjustable in the field with tools readily available so that misalignment can be immediately corrected and the facing panel and excavation face joined in their desired relationship.

One solution to the problem of misalignment is described in my prior U.S. Pat. No. 4,913,594, which is specifically directed to attaching a soldier pile to a facing panel. This solution makes use of T-shaped brackets attached to both the soldier pile and the facing panel, with the cross-piece or top of the T of each bracket flush with the soldier pile and the facing panel. The legs of each T extend toward each other, and a so-called facing plate extends between and connects the extending legs of the T's of the T-shaped brackets. Each bracket has vertical and horizontal slots for providing horizontal and vertical motion.

It has been my experience that the device disclosed in such prior patent has several deficiencies, among which the fact that the only way to vary the distance between the T-shaped bracket of the facing panel and the T-shaped bracket of the soldier pile is by substituting a facing plate of a different length. Thus, a single facing plate may be either too short or too long to bridge a particular distance between the two connecting brackets, and a supply of facing plates of varying lengths must be maintained at the job site, requiring the provision of an inventory. This is not only expensive, but the inventory may be rapidly depleted of facing plates of particular length, and it is rare that a facing plate will ever be of the precise size that is required in order to join the two T-shaped brackets.

It is, therefore, one object of the present invention to provide connecting means between a fixed support on an excavation face and a facing panel which will allow the connecting means on the excavation face and the panel to be held in relation to each other without any need for maintaining an inventory of parts. Expressed otherwise, it is my object to have a single connecting structure that is capable of correcting misalignment between the support and panel, which connecting structure is infinitely variable, so that one structure can correct all the degrees of misalignment normally encountered.

It is another object of the present invention to accomplish the connection of a facing panel to a fixed support of an excavation where the connecting means will be rugged, easily adjustable at the job site, and require only a single point of contact to the fixed support of the excavation face, so that, for example, the connecting means at the excavation face may be a single fixed member, e.g., a soil nail, rather than necessarily being a soldier pile to which multiple points of connection must be utilized.

SUMMARY OF THE INVENTION

In its basic form, the connecting structure of my invention is a system that makes use of two rigid brackets, one attached to a fixed support on the excavation face and having a leg extending substantially outwardly therefrom in the direction of the panel, and a second rigid bracket with one leg substantially contiguous with the panel face in the other leg extending outwardly in the direction of the excavation face. Each of the outwardly extending legs of the brackets has an aperture through it, and a pin is positioned in the aperture. Each pin has a head and shank portion, the latter extending through the aperture in the outwardly extending leg of the bracket so that the shank projects beyond the face of the bracket and to a Position limited by the head of the pin.

In addition, each shank portion of its pin has a bore extending through it at the part that protrudes beyond the plane of its bracket leg, and a rod is mounted for rotary motion between the bores of the shank portions. In this manner, the pins and their respective brackets are joined by the rod and full adjustability of the connecting system is achieved despite possible misalignment between the brackets attached to both the fixed support of the excavation face and the facing panel.

With greater specificity, each bracket is held on its support or panel by means that may be adjusted between a position in which the bracket is slightly spaced from its support to permit rotation of the bracket about the connecting means, and a position in which that connecting means holds the bracket more tightly against the face of its support or panel. That structure thereby permits rotation of the brackets on their support structures.

Still another aspect of the Present invention is that the rod that extends between the bores and the respective pins is threaded, and there is means Positioned on the rod to hold the rod in position against rotary motion and thereby fix the effective length of the rod and, as a result, the effective distance between the Pins, which are rotatable on their brackets. So, by varying the effective length of the rod, a single rod may be utilized despite variances that may be encountered in the distances between the face support and the face panel. In this manner a single connecting system is provided which may be used to connect a facing panel to a fixed support on an excavation face regardless of the variances in alignment that may be encountered in normal job practices.

These and other objects, features and advantages of the present invention will be more apparent when considered in connection with the following detailed description of a preferred embodiment of my invention as illustrated in the accompanying drawings, in which:

FIG. 1 is a side elevational view showing my preferred embodiment of the connecting structure in a position in which the panel and support are aligned, and FIG. 2 is a perspective view of the invention showing how my connecting structure joins a facing panel and a support despite severe misalignment thereof.

DETAILED DESCRIPTION OF THE INVENTION

Figure 1:
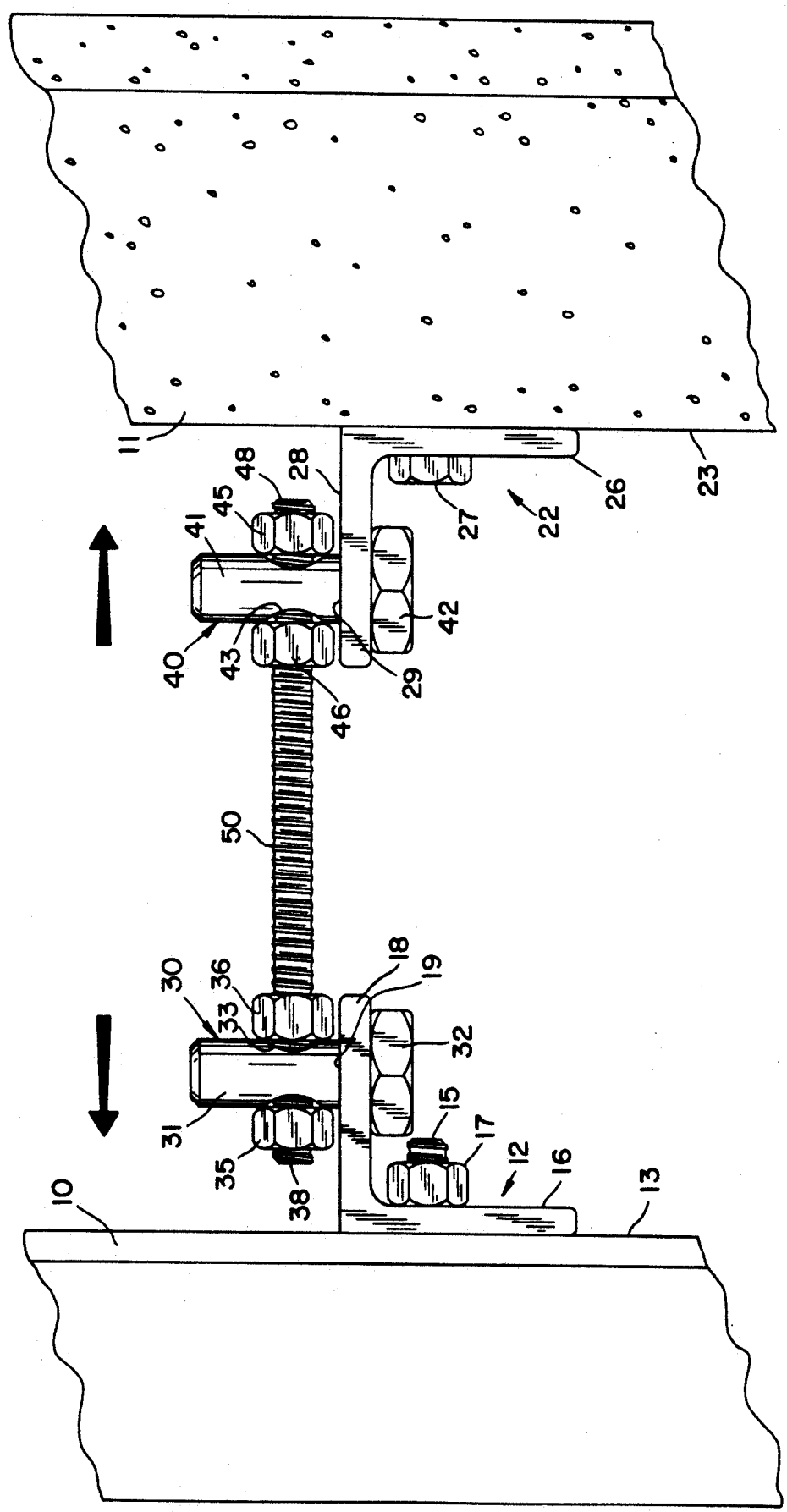

Referring now to the drawings, and in particular to FIG. 1 thereof, the two structures to be joined are a fixed support 10 that is part of an excavation face, and a facing panel, which may be made of concrete and is indicated by reference numeral 11. Fixed support 10, which may be a soldier pile, has an L-shaped bracket 12 fixed to support face 13 by means of a threaded member 15, which extends through an aperture in leg 16 of bracket 12. Threaded shaft 15 extends through the aperture in leg 16 and into the fixed support 10 in such a manner that as to be rigidly and firmly held within that support. A nut 17 is threaded on to the end of the shaft 15 and, as shown, is threaded so that the leg 16 is contiguous with face 13 of support 10 and is held against that face. The other leg of the L-shaped bracket 12, which is designated by reference numeral 18, extends outwardly away from the face 13 in the general direction of the facing panel 11.

The facing panel 11, which has an exposed face 23, has a connecting structure attached to that face similar to the structure attached to face 13 of fixed support 10. Thus, facing panel 11 has an L-shaped bracket 22 mounted thereon in such manner that one leg 26 of the bracket 22 is flush with the face 23 of the facing panel 11, while the other leg 28 extends outwardly from that face and is substantially normal thereto. A threaded shaft (not shown) extends through a suitable aperture in bracket leg 26 and into the interior of the facing panel, and is maintained therein by a head 27. In the actual embodiment illustrated, head 27 is what is seen of a unitary threaded shaft, e.g., a screw which, by rotation of the head 27, may be screwed into the facing panel 11. As shown, screwhead 27 has been rotated so that leg 26 of bracket 22 is maintained in a position in which it is contiguous with the face 23 of panel 11.

With regard to the outwardly extending bracket legs 18 and 28, each has an aperture, 19 and 29, drilled through that leg. Pins 30 and 40 are positioned in apertures 19 and 29, respectively, so that the shank portions 31 and 41 extend through the apertures and protrude beyond the planes of bracket legs 19 and 29. Pin heads 32 and 42 are wider than the apertures 19 and 29 serve to limit axial movement of the pins in their apertures.

Each of the pins 30 and 40 has a bore provided in the shank portions 31 and 41. Those bores, designated respectively, by numerals 33 and 43, extend through the shank portions and are of a size sufficient to accommodate a threaded rod 50 within the bores. In my preferred embodiment the bores in the pins 30 and 40 are not threaded, and so that, interiorly threaded nuts 35 and 36 are threaded onto the rod 50 on either side of the pin 30, and interiorly threaded nuts 45 and 46 are similarly threaded onto the rod 50 on either side of the pin 40. In this manner, the rod 50 is maintained against inadvertent motion in an axial direction and subsequent disengagement with the pins 30 and 40, and the rod's transverse movement is limited by contact of the nuts with the legs 18 and 28 of the respectively brackets, as well as by contact of the pin heads 32 and 42 with those bracket legs.

Figure 2:
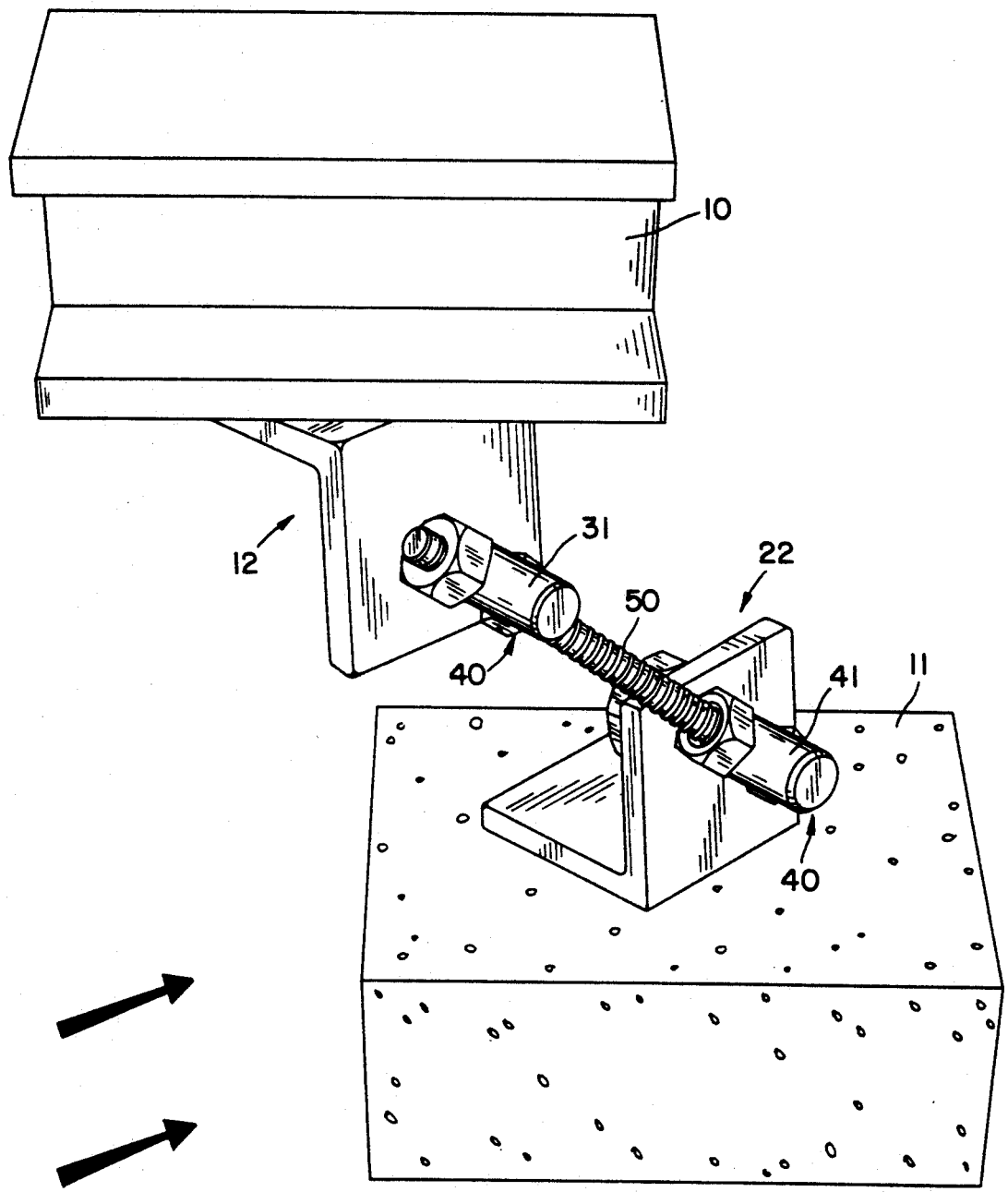

The operation of the Preferred embodiment of my connecting structure illustrated FIG. 1 to join the fixed support 10 to facing panel 11 when those structures are decidedly misaligned is illustrated in FIG. 2 of the drawings. As there shown, the fixed support 10 and facing panel 11 are joined although the brackets 12 and 22 are out of alignment, both laterally and transversely. So, in FIG. 2, bracket 12 has been rotated about shaft 15, the nut 17 first having been loosened to permit such rotation, so that the bracket extends beyond the plane of the fixed support 10. In a somewhat similar manner bracket 22 has likewised been rotated. In order to provide a further adjustment, the apertures 19 and 29 in legs 18 and 28 are not threaded. As a result, the shank portions of the pins 30 and 40, which portions extend through those apertures, are rotatable and will rotate in response to rotation of the outwardly extending legs 18 and 28 of brackets 12 and 22. Such rotation of the pins, whose shank portions 31 and 41 are visible in FIG. 2, has occurred to bring the pins into the positions shown.

On rotation of the pins 30 and 40, rod 50 moves between those pins but still maintains the same effective length unless otherwise adjusted. It will be apparent that such effective length can be varied by rotation of the nuts 35 and 36, at one end, and 45 and 46, at the other end, which nuts hold the rod 50 on the pins 30 and 40. By rotation of the threaded nuts 35 and 36, as well as nuts 45 and 46, the effective length of the rod 50 as it extends between the brackets 12 and 22 may be varied. For example, if as shown in FIG. 1, it is desired to move the fixed support 10 and the facing Panel 11 closer together, nuts 36 and 46 can be rotated inwardly along the threads of rod 50, so that after such movement the pins 31 and 41 can be moved toward each other. Nuts 35 and 45 are then screwed inwardly onto the rod 50 until they once again abut Pin shank portions 31 and 41. As shown in FIG. 1 and partially in FIG. 2, the effective length of the rod 50 is almost at a maximum, since obviously the exterior nuts 35 and 45 cannot be rotated beyond the ends 38 and 48 of the rod 50.

As a consequence, the connecting structure according to my invention allows for connection of a fixed support and a facing panel regardless of displacement of the respective brackets within, of course, the limits of the connecting structure. Also, it allows the panel and fixed support to be maintained in fixed relation to each other regardless of variations in the distances between the facing panel and the face of the excavation. All such misalignments, as well as variances in spacing, will be corrected by the connecting structure of the present invention without the necessity of maintaining an inventory of different parts, some of which will be utilized according to the specific misalignment encountered. Instead, the structure of my invention accounts for all such variations and misalignment.

It will be apparent to those of skill in this art that certain alterations and modifications may be made to the preferred embodiment described in detail in the foregoing specification without the departing from the spirit of my invention. As to all such obvious alterations and modifications, it is desired that they be included within the purview of my invention, which is to be limited only by the scope, including equivalents, of the following, appended claims.

I claim:

1. A structure for connecting a fixed support to a facing panel located in position to support or mask the face of an excavation while making allowance for Possible misalignment between the support and the panel, comprising
    a first bracket having at least two legs extending in substantially perpendicular relationship to each other, one of said legs of said first bracket being positioned substantially contiguous with said excavation face and rotatable with respect thereto, and the other leg extending substantially outwardly therefrom in the direction of said facing panel,
    a second bracket having at least two legs extending in substantially perpendicular relationship to each other, one of said legs of said second bracket being positioned substantially contiguous with said facing and rotatable with respect thereto, and the other leg of said second bracket extending outwardly in the direction of said excavation face,
    each of said outwardly extending legs of said brackets having an aperture therethrough,
    pins positioned in the apertures of the outwardly extending legs of each of said brackets, said pins each having head and shank portions, said shank portions being located in said apertures and extending therethrough and having a part protruding beyond the surface of said outwardly extending legs, each of said pins being formed with a bore extending through its respective shank portion at said protruding part thereof, and
    a rod extending between and mounted for rotary motion in said bores of said shank portions of said pins and thereby joining said pins and their respective brackets, whereby by varying the radial positions of said rod and said brackets fixed support and said facing panel may be joined despite misalignment between them.

2. A connecting structure as claimed in claim 1, including means for holding said first bracket to said fixed support, said means being adjustable between a position in which said first bracket is slightly spaced from said excavation face to permit rotation of said bracket relative to said excavation face, and a position in which said means holds said first bracket tightly against said excavation face to inhibit rotary movement of said bracket.

3. A connecting structure as claimed in claim 2, including means for holding said second bracket in Position against said facing panel, said means being adjustable between a position in which said second bracket is slightly spaced from said facing panel to permit rotation of said bracket relative to said facing panel, and a position in which said means holds said second bracket tightly against said facing panel to inhibit rotary movement of said bracket.

4. A connecting structure as claimed in claim 1, including means for holding said second bracket in position against said facing panel, said means being adjustable between a position in which said second bracket is slightly spaced from said facing panel to permit rotation of said bracket relative to said facing panel, and a position in which said, means holds said second bracket tightly against said facing panel to inhibit rotary of said bracket.

5. A connecting structure as claimed in claim 1, in which both said first and second brackets are L-shaped, and each of said brackets has apertures extending through both legs of its L.

6. A connecting structure as claimed in claim 1, in which at least one of said pins is freely rotatable in its aperture in an outwardly extending leg of its bracket.

7. A connecting structure as claimed in claim 1, in which each of said pins is freely rotatable in its aperture in said outwardly extending leg of its bracket.

8. A structure for connecting a fixed support to a facing panel located in position to support or mask the face of an excavation while making allowance for Possible misalignment between the support and the panel, comprising
    a first bracket having at least two legs extending in substantially perpendicular relationship to each other, one of said legs of said first bracket being positioned substantially contiguous with said excavation face and rotatable with respect thereto, and the other leg extending substantially outwardly therefrom in the direction of said facing panel,
    a second bracket having at least two legs extending in substantially perpendicular relationship to each other, one of said legs of said second bracket being Positioned substantially contiguous with said facing panel and rotatable with respect thereto, and the other leg of said second bracket extending outwardly in the direction of said excavation face,
    each of said outwardly extending legs of said brackets having an aperture therethrough,
    pins positioned for rotary movement in the apertures of the outwardly extending legs of each of said brackets, said pins each having head and shank portions, said shank portions being located in said apertures and extending therethrough and having a part protruding beyond the surface of said outwardly extending legs, each of said pins being formed with a bore extending through its respective shank portion at said Protruding part thereof, and a rod extending between and mounted for rotary motion in said bores of said shank portions of said pins and thereby joining said pins and their respective brackets, said rod being threaded and cooperating with threads in said bores of said shank portions of said pins to vary the effective distance between said pins, whereby by varying the effective length of said rod and the radial positions of said pins and said brackets, said fixed support and said facing panel may be joined despite misalignment between them.

9. A connecting structure as claimed in claim 8, further including positioning means on each end of said rod outwardly of said pins to maintain said rod in said pin bores against accidental displacement therefrom.

10. A connecting structure as claimed in claim 8, further including positioning means on said rod inwardly of said pins to adjust the effective length of said rod.

11. A connecting structure as claimed in claim 8, further including positioning means outwardly and inwardly of said pin at each end of said rod to adjust and maintain the effective length of said rod.

* * * * *